(12) United States Patent
Kamranzadeh et al.

(10) Patent No.: US 10,639,800 B2
(45) Date of Patent: May 5, 2020

(54) ROBOTIC-ARM END EFFECTOR CONFIGURED TO ENGAGE A PLURALITY OF STORAGE CONTAINERS, AND METHOD OF USING THE SAME

(71) Applicant: Amazon Technologies, Inc., Seattle, WA (US)

(72) Inventors: Vahideh Kamranzadeh, Seattle, WA (US); Todd McIntosh, Holland, MI (US); Seshachalamgupta Motamarri, Redmond, WA (US); Tyson Wittrock, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/032,875

(22) Filed: Jul. 11, 2018

(65) Prior Publication Data

US 2020/0016770 A1 Jan. 16, 2020

(51) Int. Cl.
*B25J 15/00* (2006.01)
*B65D 21/02* (2006.01)
(Continued)

(52) U.S. Cl.
CPC ......... *B25J 15/0014* (2013.01); *B25J 9/0009* (2013.01); *B25J 9/06* (2013.01);
(Continued)

(58) Field of Classification Search
CPC ............... B25J 11/0095; B25J 15/0009; B25J 15/0014; B25J 15/0019; B25J 15/0085;
(Continued)

(56) References Cited

U.S. PATENT DOCUMENTS 6,039,375 A * 3/2000 Bauman ............... B25J 15/0253
294/119.1
6,592,324 B2 * 7/2003 Downs ................. B25J 15/0253
294/104
(Continued)

FOREIGN PATENT DOCUMENTS

CN 205363927 U 7/2016
DE 19713996 A1 11/1998
(Continued)

OTHER PUBLICATIONS

International Patent Application No. PCT/US2019/040967; Int'l Search Report and the Written Opinion; dated Oct. 22, 2019; 14 pages.

*Primary Examiner* — Stephen A Vu
(74) *Attorney, Agent, or Firm* — BakerHostetler

(57) ABSTRACT

In one embodiment, an end effector for a robotic manipulator has a base that is configured to attach to the end of a robotic arm, a first fork, and a second fork. The end first fork includes a first pair of prongs that extend from the base along a first direction and that are spaced from one another so as to receive a first storage container therebetween. The second fork includes a second pair of prongs that extend from the base along a second direction that is angularly offset from the first direction and that are spaced from one another so as to receive a second storage container therebetween. The first and second forks can be used to stack or unstack the first and second containers.

20 Claims, 8 Drawing Sheets

(51) Int. Cl.
*G06Q 10/08* (2012.01)
*B25J 9/00* (2006.01)
*B25J 9/06* (2006.01)
*B25J 9/16* (2006.01)
*B65D 5/42* (2006.01)

(52) U.S. Cl.
CPC ......... *B25J 9/1669* (2013.01); *B25J 15/0052* (2013.01); *B65D 5/4208* (2013.01); *B65D 21/0216* (2013.01); *G06Q 10/087* (2013.01)

(58) Field of Classification Search
CPC ........ B25J 15/0052; B25J 9/0009; B25J 9/06; B25J 9/1669; H01L 21/67126; H01L 21/67742; B65D 21/0216; B65D 5/4208; G06Q 10/087
USPC .......................................................... 294/213
See application file for complete search history.

(56) References Cited

U.S. PATENT DOCUMENTS

| | | | | |
|---|---|---|---|---|
| D552,138 S | * | 10/2007 | Kondo | ............ D15/199 |
| 7,616,289 B2 | * | 11/2009 | Chae | ........... B25J 9/023 |
| | | | | 349/187 |
| 8,376,428 B2 | * | 2/2013 | Rebstock | ......... B25J 15/0052 |
| | | | | 294/2 |
| 9,618,857 B2 | * | 4/2017 | Volkov | ........... G03F 7/70741 |

FOREIGN PATENT DOCUMENTS

| | | |
|---|---|---|
| DE | 102013003768 A1 | 8/2014 |
| WO | WO 2011/129699 A1 | 10/2011 |
| WO | WO 2015/153697 A1 | 10/2015 |

\* cited by examiner

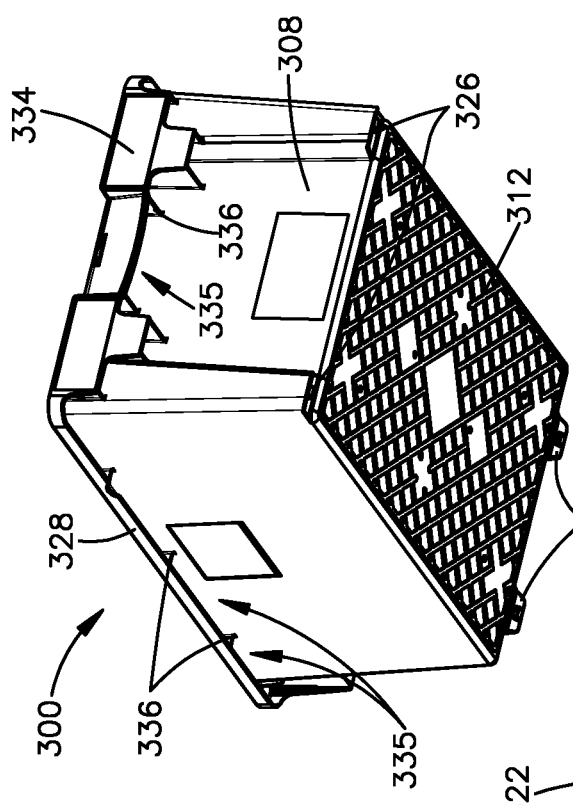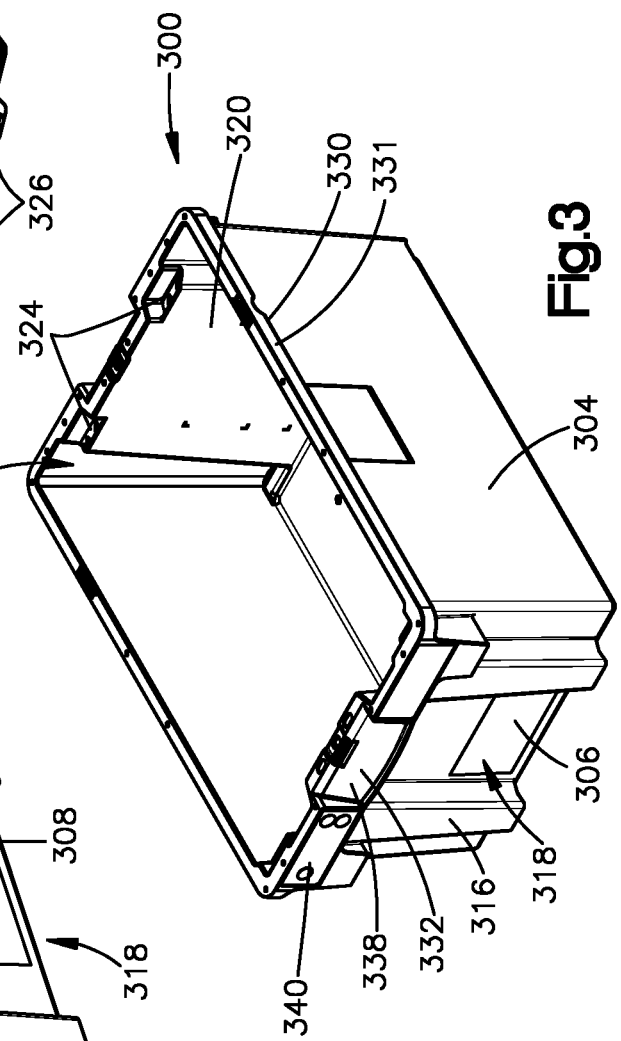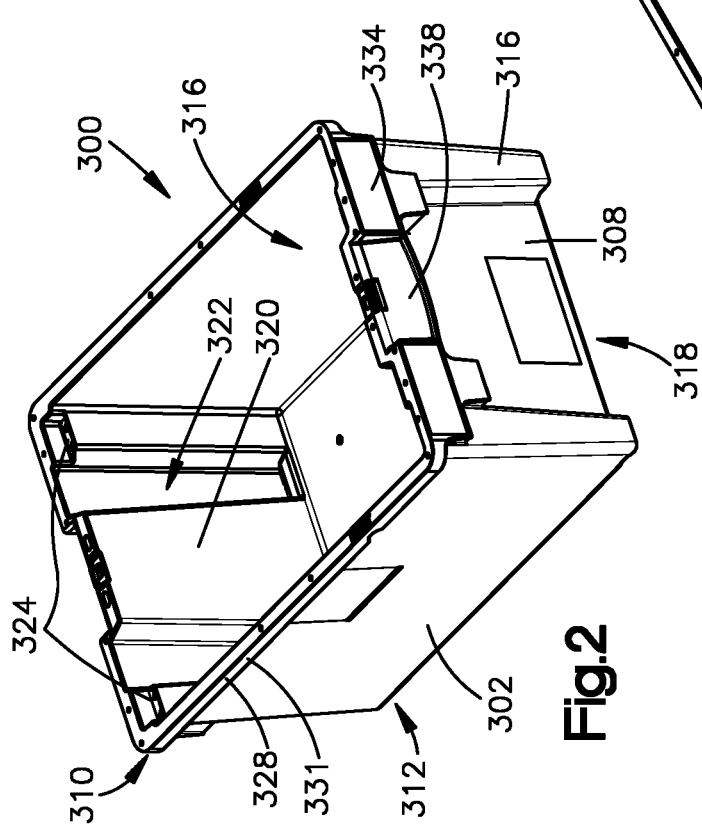

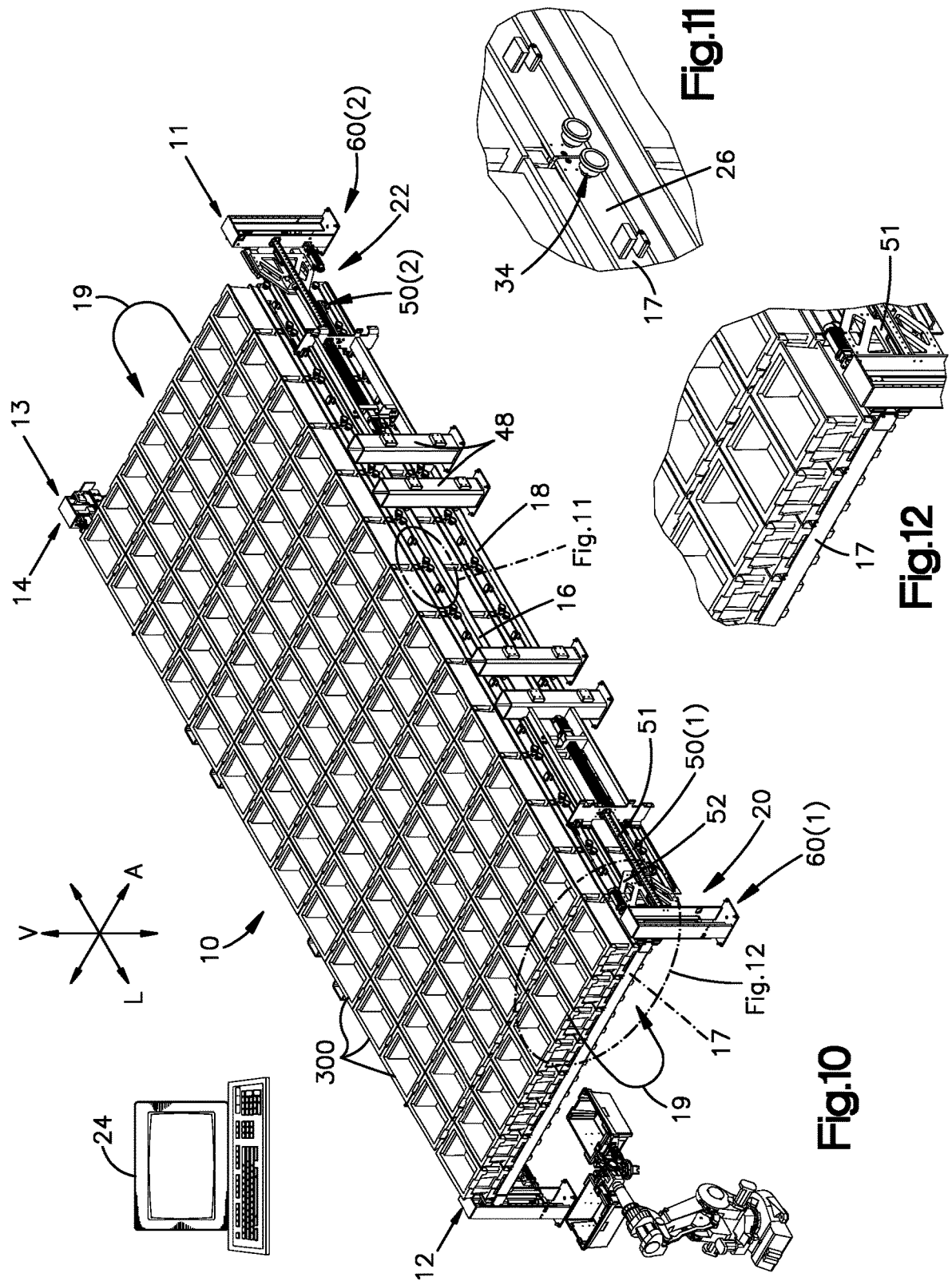

ROBOTIC-ARM END EFFECTOR CONFIGURED TO ENGAGE A PLURALITY OF STORAGE CONTAINERS, AND METHOD OF USING THE SAME

BACKGROUND

Inventory storage facilities such as warehouses and distribution centers commonly employ shelving units to hold inventory items until they are needed to fulfill a customer order. The shelving units are arranged in rows that are spaced from one another so as to define aisles between the rows of shelving units. To store an inventory item on a desired shelving unit, a human can carry the inventory item down an aisle in the warehouse to the desired shelving unit and place the inventory item on the desired shelving unit where it is stored until it is needed. When an order is placed, a human can travel down the aisle to the desired shelving unit, retrieve the inventory item from the desired shelving unit, and place the inventory item on a conveyor belt that carries the inventory item downstream for packaging and shipping. There are some systems in which containers are oriented in rows, and the entire row moves up or down vertically under the control of an operator.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 2 shows a top perspective view of an inventory storage container according to one embodiment;

FIG. 3 shows another top perspective view of the inventory storage container of FIG. 2;

FIG. 4 shows a bottom perspective view of the inventory storage container of FIG. 2;

FIG. 10 shows a perspective view of a system according to one embodiment that comprises a storage module and the robotic manipulator of FIG. 1;

FIG. 11 shows an enlarged view of a portion of the storage module of FIG. 10 at a side of the storage module;

FIG. 12 shows an enlarged view of the front, right corner of the storage module of FIG. 10.

DETAILED DESCRIPTION

Increasingly, various conveying devices, including, but not limited to, conveyor belts, delivery vehicles, and robotic arms are being used in lieu of human manpower to store inventory items and to transport inventory items to various locations around storage facilities. Due to difficulties in moving inventory items of different sizes and shapes, the inventory items can be moved in storage containers such as the storage container 300 shown in FIGS. 2-4. The storage containers can be moved around the storage facility using the various conveying devices mentioned above. In some instances, it may be desirable to manipulate two or more storage containers concurrently. For example, it may be desirable to stack two storage containers on top of one another and/or unstack two storage containers from one another.

Figure 1:
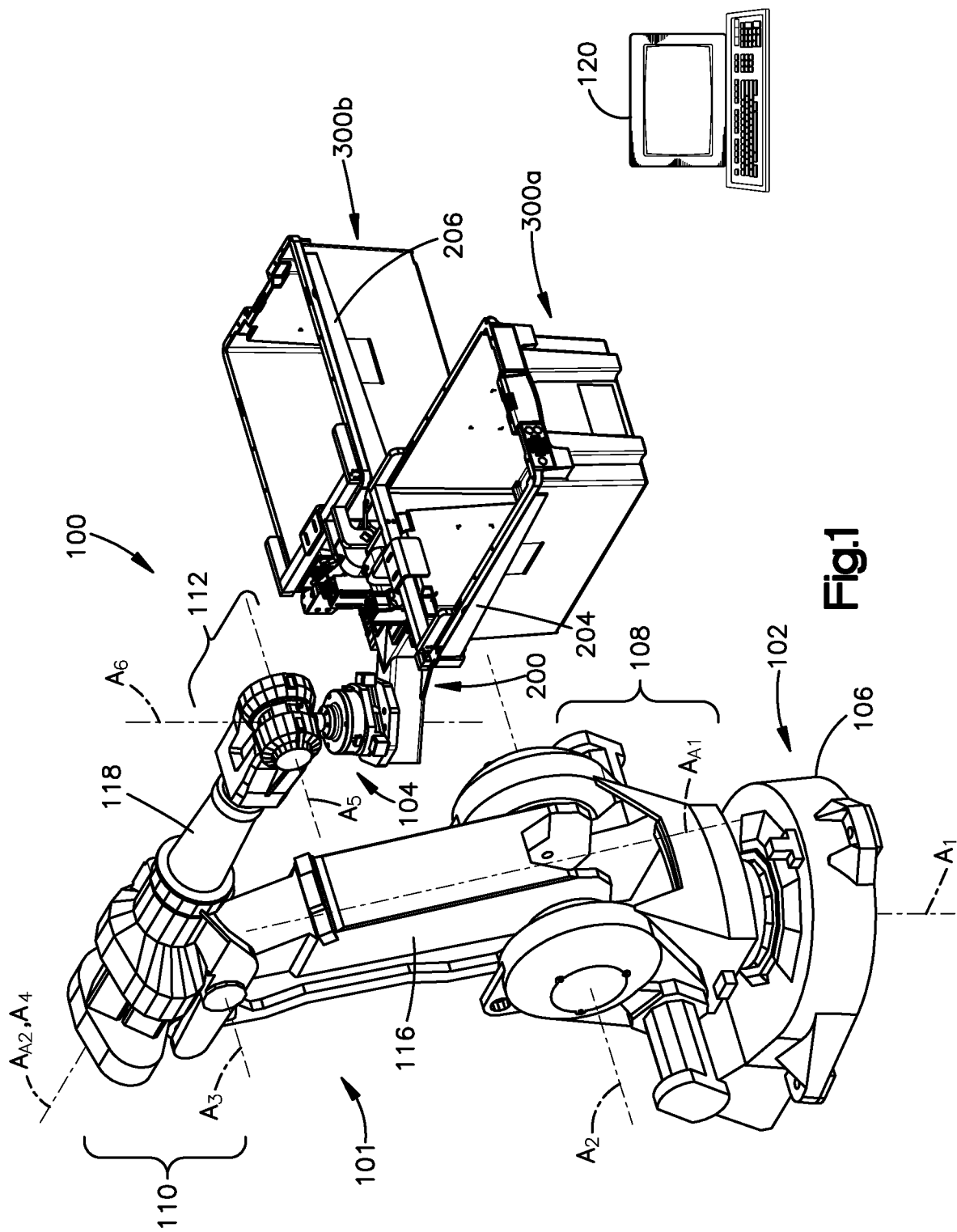
FIG. 1 shows a perspective view of a system comprising a robotic manipulator and first and second storage containers according to one embodiment.

Referring to FIG. 1, a system is shown that comprises a robotic manipulator 100 and a plurality of storage containers. The robotic manipulator 100 is configured to manipulate at least first and second storage containers 300a and 300b concurrently. In some embodiments, the robotic manipulator 100 can be configured to stack the first and second storage containers 300a and 300b on top of one another and/or unstack the first and second storage containers 300a and 300b from one another. The robotic manipulator 100 comprises an end effector 200 that is configured to removably couple to the first and second storage containers 300a and 300b, and a robotic arm 101 that is configured to move the end effector 200, and hence move the first and second storage containers 300a and 300b. Each inventory storage container can be any suitable storage container configured to carry one or more inventory items therein. Preferably, the inventory storage containers are open-top plastic totes configured to carry items in an e-commerce supply chain. The totes are of a size that an individual person or robot can lift.

Turning briefly to FIGS. 2-4, one example of an inventory storage container 300 is shown that can be used to implement the first and second storage containers 300a and 300b. The storage container 300 can be a rectangular structure, such as a bin or tote, formed from a rigid material such as high-density plastic, wood, aluminum, or other suitable material. The storage container 300 can have first and second container sidewalls 302 and 304 that are spaced opposite from one another. The storage container 300 can have a first and second container end walls 306 and 308 that are spaced opposite from one another. The container end walls 306 and 308 can extend between the opposed container sidewalls 302 and 304. Similarly, the container sidewalls 302 and 304 can extend between the container end walls 306 and 308.

Each container 300 has a width Ws from one of the sidewalls 302 and 304 to the other one of the sidewalls 302 and 304, and can have a length Ls from one of the end walls 306 and 308 to the other one of the end walls 306 and 308. In some embodiments, the length Ls can be greater than the width Ws. Each storage container 300 can further have an upper end 310 and a lower end 312 spaced opposite from one another. The lower end 312 can include a bottom wall 314 that can extend between the opposed sidewalls 302 and 304 and between the opposed end walls 306 and 308. The upper end 310 can be open for ease of access in placing inventory items into, and retrieving inventory items from, the storage container 300. In some embodiments, the upper end 310 can include a lid or top (not shown) that can be selectively opened and closed. Each container 300 can have a height Hs from the upper end 310 to the bottom wall 314. The sidewalls 302 and 304, the end walls 306 and 308, and the bottom wall 314 can together define an inner cavity 316 that is configured to support at least one inventory item therein.

The sidewalls 302 and 304 and the end walls 306 and 308 can taper inwardly as they extend from the upper end 310 towards the lower end 312. Thus, the upper end can have a cross-sectional area in a plane that is parallel to the bottom wall 314 that is greater than a cross-sectional area of the bottom wall 314. As a result, the storage container 300 can be configured to nest within an identical storage container 300 when the two storage containers are arranged relative to one another in a nesting orientation.

For example, the nesting orientation can be an orientation in which the end walls 306 of the storage containers are aligned with one another and the end walls 308 of the storage containers are aligned with one another. In one example, the outer surface of at least one of the end walls 306 and 308 can define at least one protrusion 316 and at least one recess 318, and the inner surface of the at least one of the end walls 306 and 308 can define at least one complementary protrusion 320 and at least one complementary recess 322. The at least one protrusion 316 can be configured to mate with the at least one complementary recess 322 of the identical storage container, and the at least one recess 318 can be configured to mate with the at least one complementary protrusion 320 of the identical storage container.

The storage container 300 can also be configured to stack on top of an identical storage container 300 when the two storage containers are arranged relative to one another in a stacking orientation. For example, the stacking orientation can be an orientation in which the end wall 306 of each storage container is aligned with the end wall 308 of the other storage container. Thus, in the stacking orientation, the two storage containers can be rotated relative to one another by 180 degrees. The storage container 300 can include at least one upper engagement surfaces 324 at the upper end 310, such as a plurality of upper engagement surfaces 324. The storage container 300 can include at least one lower engagement surface 326 at the lower end 312, such as a plurality of lower engagement surfaces 326. Each lower engagement surface 326 can be configured to rest on a corresponding one of the upper engagement surfaces 324, when the storage containers are oriented relative to one another in the stacking orientation.

The storage container 300 can include at least one upper edge, such as a plurality of upper edges, that extends outwardly from the upper end 310. For example, the storage container 300 can include at least one, up to all, of (i) an upper edge 328 that extends outwardly from the first sidewall 302, (ii) an upper edge 330 that extends outwardly from the second sidewall 304, (iii) an upper edge 332 that extends outwardly from the end wall 306, and (iv) an upper edge 334 that extends outwardly from the end wall 308. The upper edges can together form an upper stiffening rim 331 around the upper end 310. Each upper edge can define at least one recess 335 that extends into the upper edge along a direction that extends from the lower end 312 towards the upper end 310. Further, each upper edge can define at least one reinforcing rib 336 between adjacent recesses 335. The upper edges 332 and 334 of the end walls 306 and 308 can each define a handle 338 for grasping by a human hand. The upper edges can be configured to be engaged by a tine of the end effector 200 of the robotic manipulator 100 (shown in FIG. 1) as will be described in further detail below.

Each storage container 300 may include an identifier 340 (e.g., bar code, QR code, radio-frequency identification (RFID) tag, and any other suitable identifier). The identifier 340 may be used to uniquely identify the storage container 300. In some examples, the identifier 340 may include non-volatile data storage, which may be associated with the storage container 300 and/or its contents. Data can be read/written to the data storage each time the stackable storage module is accessed. This data may contain status of the stackable storage module, inventory stowed in the stackable storage module, and/or destination information for each storage container 300. In this manner, inventory information may be updated when the identifiers are read.

Returning to FIG. 1, the robotic arm 101 has a first arm end 102 and a second arm end 104 that are offset from one another. The first arm end 102 can have a base 106 that is configured to be mounted to a supporting structure (not shown) such as a floor, a ceiling, a shelf, a conveyor or other device that can move the robotic manipulator, or any other suitable supporting structure. Thus, the base 108 can have a position that is fixed relative to the supporting structure. The second arm end 104, on the other hand, can be a free end that is not mounted to any supporting structure. Thus, the second arm end 104 can be movable relative to the supporting structure and relative to the first arm end 102.

The robotic arm 101 can have a first arm segment 116 and a second arm segment 118. The first arm segment 116 can be extend between the base 106 and the second arm segment 118 along a first arm axis $A_{A1}$. For example, the first arm segment 116 can extend from the base 106 to the second arm segment 118. The second arm segment 118 can extend between the second arm end 104 and the first arm segment 116 along a second arm axis $A_{A2}$. For example, the second arm segment 118 can extend from the first arm segment 116 to the second arm end 104. The robotic arm 101 can have a plurality of joints (e.g., 108, 110, and 112) that are configured to enable the robotic arm 101 to articulate.

For example, the robotic arm 101 can have a joint 108 that is positioned adjacent to the base 106, such as between the base 106 and the first arm segment 116. In some embodiments, the joint can attach the first arm segment 116 to the base 106. The joint 108 can be configured to rotate and/or pivot the first arm segment 116 relative to the base 106 about at least one axis. For example, the joint 108 can be configured to rotate the first arm segment 116 relative to the base about an axis $A_1$ that extends along a direction that is perpendicular to the direction in which the base 106 mounts to the supporting structure. Additionally or alternatively, the joint 108 can be configured to pivot the first arm segment 116 relative to the base 106 about an axis $A_2$. The axis $A_2$ can be perpendicular to the first arm axis $A_{A1}$. The joint 108 can be considered to be a shoulder joint as it can simulate the shoulder joint of a human arm. In the orientation shown, the axis $A_1$ extends along the vertical direction. However, it will be understood that the robotic arm 101 can be mounted such that the axis $A_1$ extends along another direction, such as a horizontal direction.

The robotic arm 101 can include a joint 110 that is configured to rotate and/or pivot the second arm segment 118 relative to the first arm segment 116 about at least one axis. For example, the joint 110 can be configured to pivot the second arm segment 118 relative to the first arm segment 116 about an axis $A_3$. The axis $A_3$ can be perpendicular to at least one of first and second arm axes $A_{A1}$ and $A_{A2}$. The joint 110 can be positioned between the first and second arm segments 116 and 118. For example, the joint 110 can attach the first and second arm segments 116 and 118 to one another. The joint 110 can be considered to be an elbow joint as it can simulate the elbow of a human arm.

The robotic arm 101 can include a joint 112 that is positioned at the second arm end 104. The joint 112 can be configured to rotate and/or pivot the end effector 200 about at least one axis. For example, the joint 112 can be configured to rotate the end effector 200 relative to the second arm segment 118 about an axis $A_4$ that is parallel to, or in-line with, the second arm axis $A_{A2}$. Additionally or alternatively, the joint 112 can be configured to pivot the end effector 200 relative to the second arm segment 118 about an axis $A_5$ that is perpendicular to the second arm axis $A_{A2}$. Additionally or alternatively, the joint 112 can be configured to rotate the end effector 200 relative to the second arm segment 118 about an axis $A_6$ that is perpendicular to the second arm axis $A_{A2}$ and the axis $A_5$. The joint 112 can be considered to be a wrist joint as it can simulate the wrist of a human arm.

It will be understood that the robotic arm 101 could be configured in any suitable alternative manner. For example, the robotic arm 101 can have any suitable number of arm segments such as at least two arm segments or more than two are arm segments. Further, the robotic arm 101 can have any suitable number of joints such as at least two joints, at least three joints, at least four joints, or more than four joints. Thus, the robotic arm 101 can have at least two axes of rotation, at least three axes of rotation, at least four axes of rotation, or more than four axes of rotation.

The robotic manipulator 100 may include at least one drive 114, such as a plurality of drives 114, that are configured to move the first arm segment 116, the second arm segment 118, and the end effector 200 about the axes. Each drive 114 can be a motor, a pneumatic actuator, or another suitable drive. The at least one drive 114 can be controlled by a controller 120. Thus, the controller 120 can be configured to control movement of the robotic manipulator 100 by controlling the at least one drive 114.

The robotic manipulator may include any suitable type and number of sensors disposed throughout the robotic manipulator (e.g., sensors on one or more of the base 106, the first arm segment 116, the second arm segment 118, the joints 108, 110, and 112, the end effector 200, or any other suitable location). The sensors can include sensors configured to detect pressure, force, weight, light, objects, slippage, and any other information that may be used to control and/or monitor the operation of the robotic manipulator, including the end effector 200.

Figure 5:
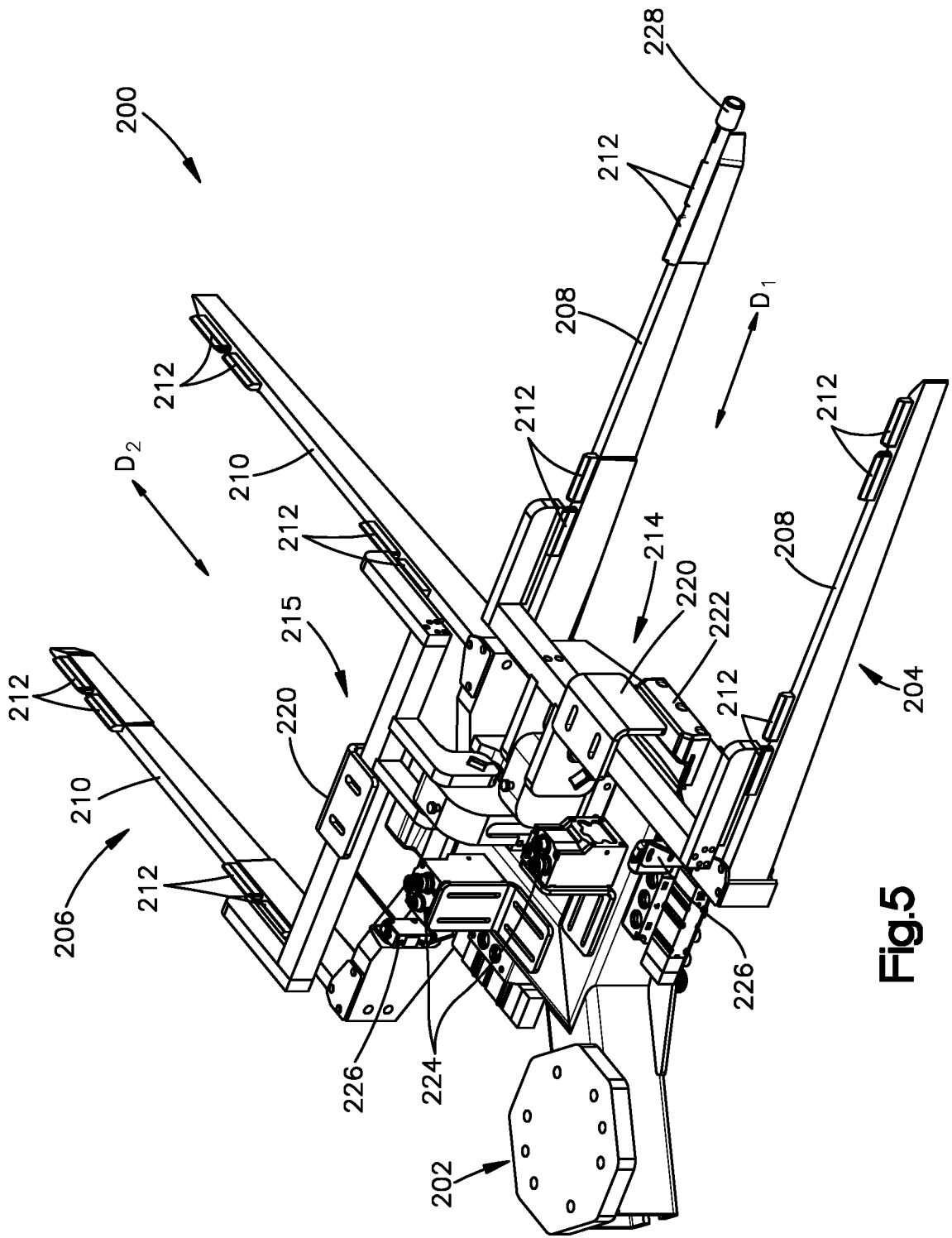
FIG. 5 shows a perspective view of the end effector of the robotic manipulator of FIG. 1 according to one embodiment.
Figure 6:
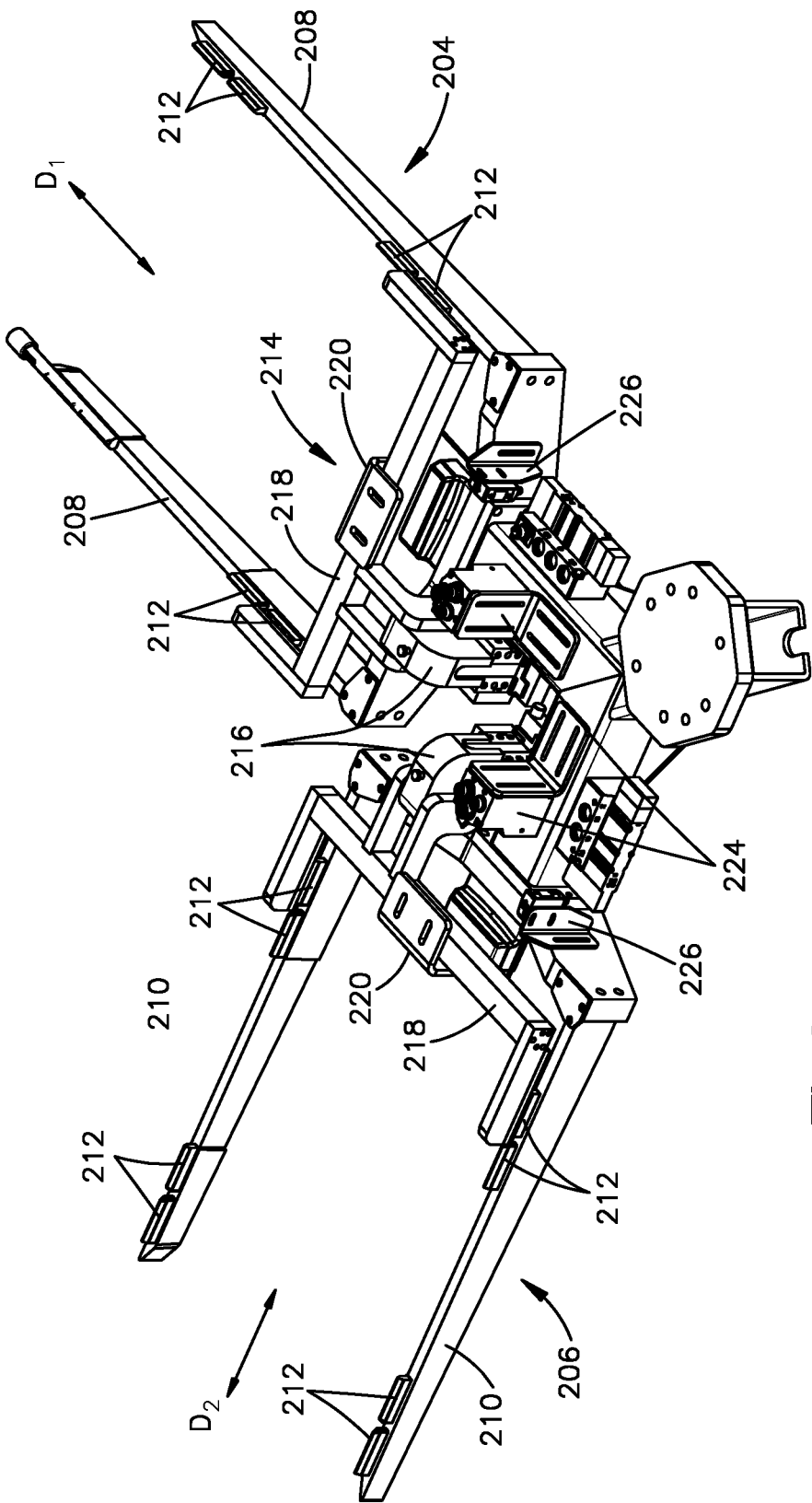
FIG. 6 shows another perspective view of the end effector of the robotic manipulator of FIG. 1 according to one embodiment.

Turning now to FIGS. 5 and 6, an exemplary embodiment of the end effector 200 is shown. The end effector 200 includes a base 202 that is configured to attach to the second arm end 104 of the robotic arm 101. The base 202 can be configured to fasten or otherwise attach to the robotic arm 101. The end effector 200 includes at least a first fork 204 and a second fork 206 that extend from the base 202. The first fork 204 includes a first pair of prongs 208. Each prong 208 of the first pair extends along a first direction $D_1$. For example, each prong 208 can be elongate along the first direction $D_1$. The prongs 208 are spaced from one another along a first perpendicular direction, that is perpendicular to the first direction $D_1$.

The first fork 204 is configured to removably couple to a first storage container 300a. In particular, the first fork 204 is configured to receive a first storage container 300a therebetween such that each prong 208 is adjacent to a respective one of the sidewalls 302 and 304 of the storage container. The positions of the prongs 208 can be fixed relative to one another while the first fork 204 is coupled to the first storage container 300a. Thus, the prongs 208 can be spaced from one another by a fixed distance while the first fork 204 is coupled to the first storage container 300a. However, in some embodiments, the distance between the prongs 208 can be adjustable based on the size of the storage container before coupling the fork 204 to the first storage container 300a.

An upper surface of each prong 208 can engage a lower surface of a respective one of the upper edges 328 and 330 of the sidewalls 302 and 304. In some embodiments, each prong 208 of the first fork 204 can include at least one protrusion 212 that is configured to be received in a recess 335 of a respective one of the upper edges 328 and 330. For example, each prong 208 can include at least one pair of protrusions 212 that is configured to be received an a corresponding pair of recesses 335 of a respective one of the upper edges 328 and 330 such that a reinforcing rib 336 is received between the pair of protrusions 212. Each protrusion 212 can extend upwardly from a respective one of the prongs 208.

Figure 7:
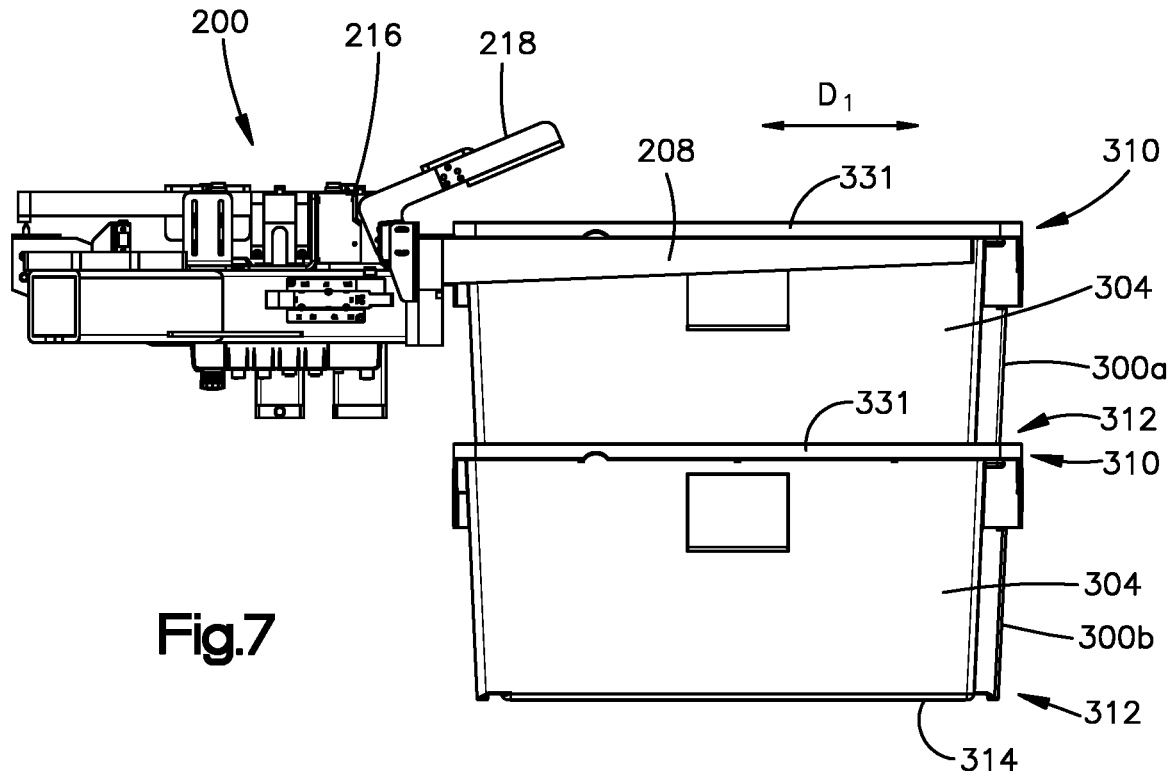
FIG. 7 shows a side view of the end effector of FIGS. 5 and 6 coupled to an inventory storage container, the end effector having a clamping mechanism in a released position.
Figure 8:
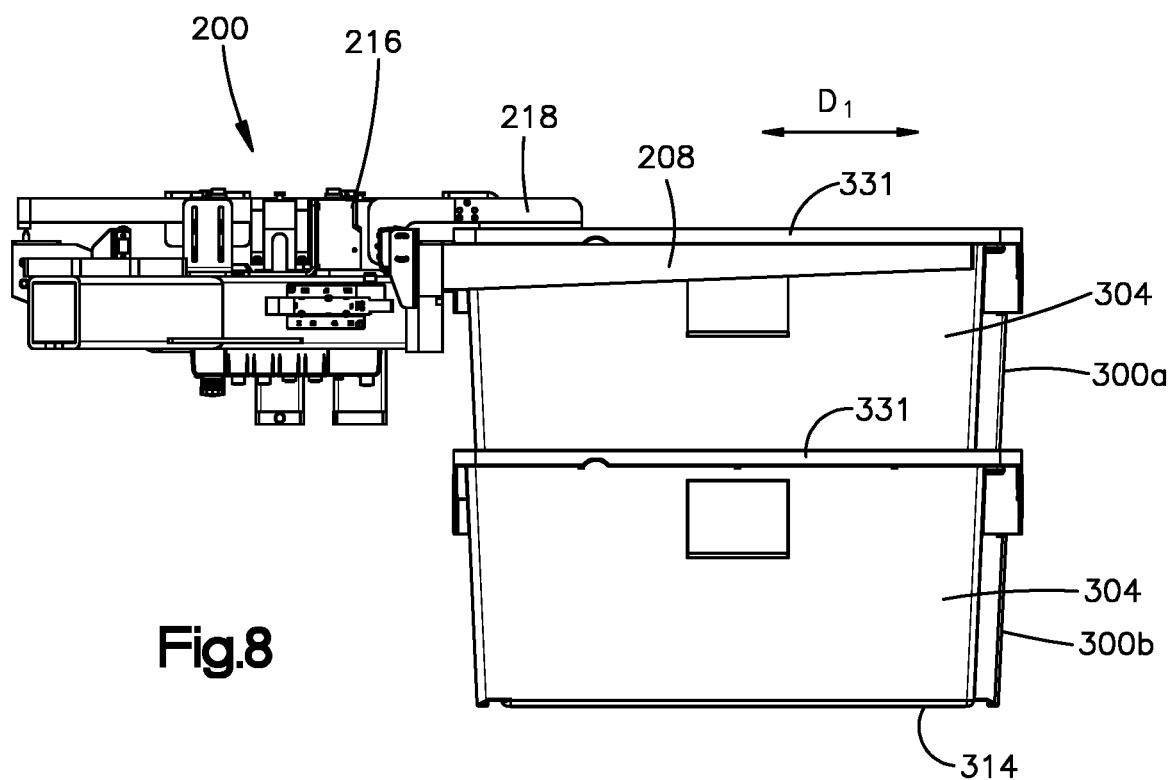
FIG. 8 shows a side view of the end effector of FIGS. 5 and 6 coupled to an inventory storage container, the end effector having a clamping mechanism in a clamped position.

The first fork 204 can include a first clamp mechanism 214 that is configured to clamp the upper rim 331 of the storage container 300a between the first clamp mechanism 214 and at least one of prongs 208 of the first fork 204. The first clamp mechanism 214 can include a clamp 216, which can be any suitable clamp such as a pneumatic clamp or an electric clamp. The first clamp mechanism 214 can include a clamp arm 218 that is attached to the clamp 216. The clamp 216 can be configured to move the clamp arm 218 between a released position as shown in FIG. 7 and a clamped position as shown in FIG. 8. In the clamped position, the clamp arm 218 can be spaced above the prongs 208 of the first fork 204 by a first distance that is substantially equal to a height of the upper rim 331 of the first storage container 300a. Thus, in the clamped position, the clamp arm 218 can engage the upper rim 331 of the first storage container 300a, such as the upper edges 328 and 330 of the upper rim 331. In the released position, the clamp arm 218 can be spaced above the prongs 208 of the first fork 204 by a second distance that is greater than the first distance. The second distance can be greater than the height of the upper rim 331 of the first storage container 300a. Thus, in the released position, the clamp arm 218 can be spaced from the upper rim 331 of the first storage container 300a. In one example, the clamp 216 can be configured to rotate the clamp arm 218 about a pivot axis that extends in the first perpendicular direction between the clamped position and the released position. The clamp 216 can be configured to rotate the clamp arm 218 about an angle that is between zero and 90 degrees, such as between 20 and 70 degrees, such as between 30 and 60 degrees.

The first clamp mechanism 214 can optionally include a catch 220 that extends downward from the clamp arm 218 between the prongs 208. The catch 220 can be configured to engage an inner surface of the storage container 300a when the first clamp mechanism 214 is in the clamped position, such as an inner surface of one of the first and second end walls 306 and 308. For example, the catch 220 can be a protrusion that extends downward from the clamp arm 218. The catch 220 can limit translation of the first storage container 300a away from the first fork 204 along the first direction $D_1$ when the clamp mechanism 214 is in the clamped position.

The first fork 204 can optionally include a handle catch 222 that extends upward between the prongs 208. The handle catch 222 can be configured to engage an inner surface of one of the handles 338 of the first storage container 300a when the first storage container 300a is supported by the first fork 204. For example, the catch 222 can be a protrusion that extends upwards. Thus, the catch 220 can be configured to be received into a recess 335 of one of the upper edges 332 and 334 of the first and second end walls 306 and 308. The catch 220 can limit translation of the first storage container 300a away from the first fork 204 along the first direction $D_1$ when the first clamping mechanism 214 is in the clamped position and when it is in the released position.

The end effector 200 can optionally include a bar code reader 224 that is associated with the first fork 204. The bar code reader 224 can be supported by the base 202. The bar code reader 224 can be positioned and configured to read a bar code 340 on the first storage container 300a. Additionally or alternatively, the end effector 200 can include at least one product detection sensor 226, such as a photo-eye sensor, associated with the first fork 204. The at least one product detection sensor 226 can be positioned and configured to detect at least one of (i) the presence or absence of a storage container on the first fork 204 and (i) an orientation of the storage container on the first fork 204. Detecting the orientation of the storage container can be useful in determining whether the storage containers are oriented so as to be stacked on one another or nested into one another.

To couple the first fork 204 to the first storage container 300a, the robotic arm 101 translates the prongs 208 of the first fork 204 along either sidewall 302 and 304 of the first storage container 300a at a location below the upper end of the storage container 300a (e.g., at a location where the first storage container 300a is tapered). The robotic arm 101 can then translate the first fork 204 upwards along the first storage container 300a. As the first fork 204 is translated upwards, the prongs 208 engage the upper edges 328 and 330 of the storage container 300a, and optionally, the at least one protrusion 212 is received in the at least one recess 335 of the upper edges 328 and 330. Additionally, as the first fork 204 is translated upwards, the optional handle catch 222 can engage one of the handles 338 of the first storage container 300a. After translating the first fork 204 upwards, the clamping mechanism 214 can move from the released position to the clamped position so as to clamp the upper rim 331 of the storage container 300a between the first clamp mechanism 214 and at least one of prongs 208 of the first fork 204. In so doing, the optional catch 220 can engage an inner surface of one of the first and second end walls 306 and 308 of the first storage container 300a. This process can be reversed to decouple the first storage container 300a from the first fork 204.

The second fork 206 includes a second pair of prongs 210, and can be configured in a manner similar to that of the first fork 204. Each prong 210 of the second pair extends along a second direction $D_2$. For example, each prong 210 can be elongate along the second direction $D_2$. The prongs 210 are spaced from one another along a second perpendicular direction, that is perpendicular to the second direction $D_2$. The second direction $D_2$ is angularly offset from the first direction $D_1$. In some examples, the second direction $D_2$ can be substantially perpendicular to the first direction $D_1$. In other examples, the second direction $D_2$ can be angularly offset from the first direction $D_1$ by an angle other than 90 degrees. For example, the angle can be less than 90 degrees such as 45 degrees. Alternatively, the angle can be greater than 90 degrees such as 180 degrees. The first and second forks 204 and 206 can have positions that are fixed relative to one another and relative to the base 202.

The second fork 206 is configured to removably couple to a second storage container 300b. In particular, the second fork 206 is configured to receive a second storage container 300b therebetween such that each prong 210 is adjacent to a respective one of the sidewalls 302 and 304 of the storage container. The positions of the prongs 210 can be fixed relative to one another while the second fork 206 is coupled to the second storage container 300b. Thus, the prongs 210 can be spaced from one another by a fixed distance while the second fork 206 is coupled to the second storage container 300b. However, in some embodiments, the distance between the prongs 210 can be adjustable based on the size of the storage container before coupling the fork 206 to the second storage container 300b.

An upper surface of each prong 210 can engage a lower surface of a respective one of the upper edges 328 and 330 of the sidewalls 302 and 304. In some embodiments, each prong 210 of the second fork 206 can include at least one protrusion 212 that is configured to be received in a recess 335 of a respective one of the upper edges 328 and 330. For example, each prong 210 can include at least one pair of protrusions 212 that is configured to be received an a corresponding pair of recesses 335 of a respective one of the upper edges 328 and 330 such that a reinforcing rib 336 is received between the pair of protrusions 212. Each protrusion 212 can extend upwardly from a respective one of the prongs 210.

The second fork 206 can include a second clamp mechanism 215 that is configured to clamp the upper rim 331 of the storage container 300b between the second clamp mechanism 215 and at least one of prongs 210 of the second fork 206. The second clamp mechanism 215 can include a clamp 216, which can be any suitable clamp such as a pneumatic clamp or an electric clamp. The second clamp mechanism 215 can include a clamp arm 218 that is attached to the clamp 216. The clamp 216 can be configured to move the clamp arm 218 between a released position and a clamped position in a manner similar to that shown in FIGS. 7 and 8. In the clamped position, the clamp arm 218 can be spaced above the prongs 210 of the second fork 206 by a first distance that is substantially equal to a height of the upper rim 331 of the second storage container 300b. Thus, in the clamped position, the clamp arm 218 can engage the upper rim 331 of the second storage container 300b, such as the upper edges 328 and 330 of the upper rim 331. In the released position, the clamp arm 218 can be spaced above the prongs 210 of the second fork 206 by a second distance that is greater than the first distance. The second distance can be greater than the height of the upper rim 331 of the second storage container 300b. Thus, in the released position, the clamp arm 218 can be spaced from the upper rim 331 of the second storage container 300b. In one example, the clamp 216 can be configured to rotate the clamp arm 218 about a pivot axis that extends in the second perpendicular direction between the clamped position and the released position. The clamp 216 can be configured to rotate the clamp arm 218 about an angle that is between zero and 90 degrees, such as between 20 and 70 degrees, such as between 30 and 60 degrees.

The second clamp mechanism 215 can optionally include a catch 220 that extends downward from the clamp arm 218 between the prongs 210. The catch 220 can be configured to engage an inner surface of the second storage container 300b when the second clamp mechanism 215 is in the clamped position, such as an inner surface of one of the first and second end walls 306 and 308. For example, the catch 220 can be a protrusion that extends downward from the clamp arm 218. The catch 220 can limit translation of the second storage container 300b away from the second fork 206 along the second direction $D_2$ when the clamp mechanism 215 is in the clamped position.

The second fork 206 can optionally include a handle catch 222 that extends upward between the prongs 210. The handle catch 222 can be configured to engage an inner surface of one of the handles 338 of the second storage container 300 when the second storage container 300b is supported by the second fork 206. For example, the catch 222 can be a protrusion that extends upwards. Thus, the catch 220 can be configured to be received into a recess 335 of one of the upper edges 332 and 334 of the first and second end walls 306 and 308. The catch 220 can limit translation of the second storage container 300b away from the second fork 206 along the second direction $D_2$ when the second clamping mechanism 215 is in the clamped position and when it is in the released position.

The end effector 200 can optionally include a bar code reader 224 that is associated with the second fork 206. The bar code reader 224 can be supported by the base 202. The bar code reader 224 can be positioned and configured to read a bar code 340 on the second storage container 300b. Additionally or alternatively, the end effector 200 can include at least one product detection sensor 226, such as a photo-eye sensor, associated with the second fork 206. The at least one product detection sensor 226 can be positioned and configured to detect at least one of (i) the presence or absence of a storage container on the second fork 206 and (i) an orientation of the storage container on the second fork 206. Detecting the orientation of the storage container can be useful in determining whether the storage containers are oriented so as to be stacked on one another or nested into one another.

To couple the second fork 206 to the second storage container 300b, the robotic arm 101 translates the prongs 210 of the second fork 206 along either sidewall 302 and 304 of the second storage container 300b at a location below the upper end of the storage container 300b (e.g., at a location where the second storage container 300b is tapered). The robotic arm 101 can then translate the second fork 206 upwards along the second storage container 300b. As the second fork 206 is translated upwards, the prongs 210 engage the upper edges 328 and 330 of the storage container 300b, and optionally, the at least one protrusion 212 is received in the at least one recess 335 of the upper edges 328 and 330. Additionally, as the second fork 206 is translated upwards, the optional handle catch 222 can engage one of the handles 338 of the second storage container 300b. After translating the second fork 206 upwards, the second clamping mechanism 215 can move from the released position to the clamped position so as to clamp the upper rim 331 of the storage container 300b between the second clamp mechanism 215 and at least one of the prongs 210 of the second fork 206. In so doing, the optional catch 220 can engage an inner surface of one of the first and second end walls 306 and 308 of the second storage container 300b. This process can be reversed to decouple the second storage container 300b from the second fork 206.

Figure 9:
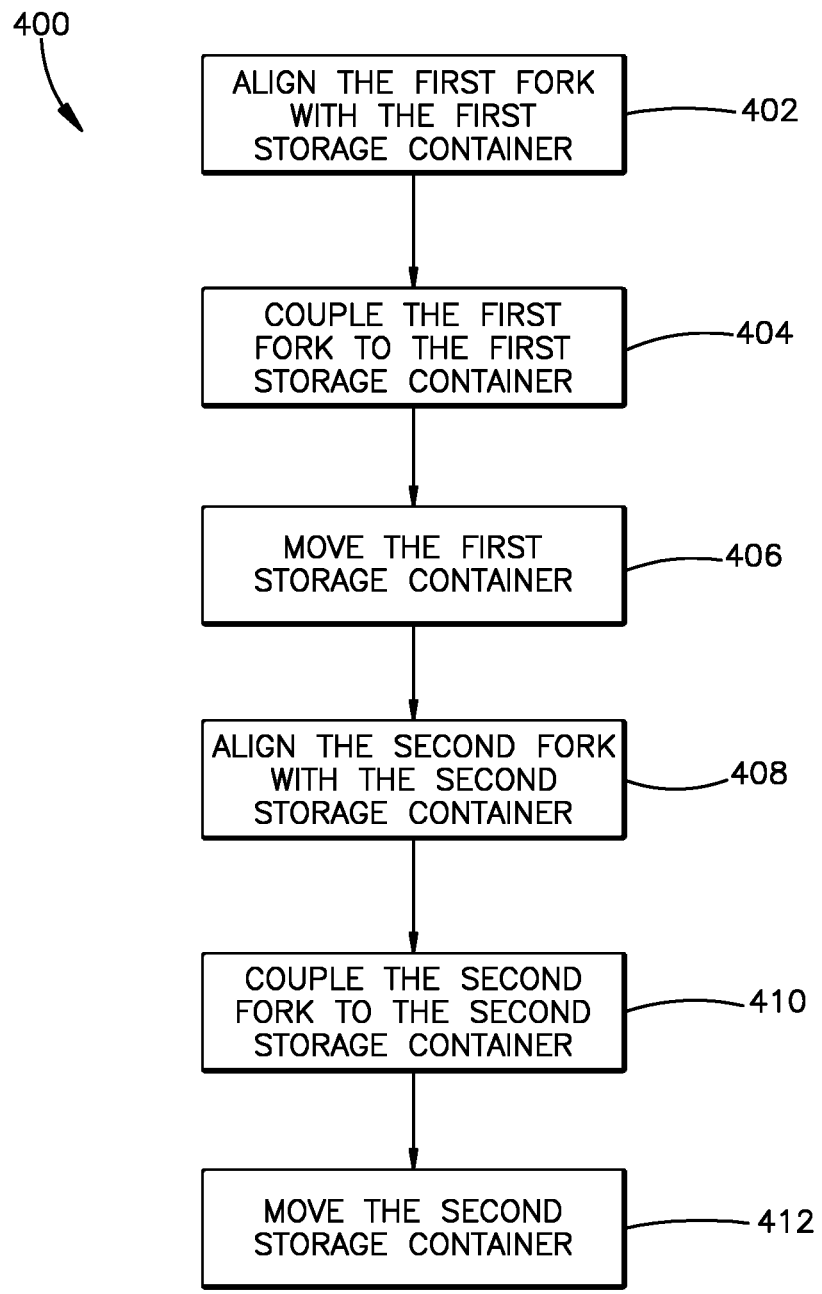
FIG. 9 shows a simplified block diagram of a method of operating the robotic manipulator of FIG. 1.

Turning now to FIGS. 1 and 9, one method 400 for operating the robotic manipulator 100 of FIG. 1 to manipulate first and second storage containers 300a and 300b will be discussed. The first storage container 300a can be stacked over the second storage container 300b as shown in FIGS. 7 and 8 or can be separate from one another. In step 402, the robotic arm 101 moves the end effector 200 so as to align the first fork 204 with the first storage container 300a along the first direction $D_1$. This step can comprise moving the first and second arm segments 116 and 118 so as to vertically and horizontally align the first fork 204 with the first storage container 300a. This step can additionally or alternatively comprise rotating the end effector 200 about the axis $A_6$ such that the prongs 208 of the first fork 204 are aligned with the first storage container 300a.

In step 404, the robotic arm 101 moves the first fork 204 so as to couple the first fork 204 to the first storage container 300a in a manner similar to that described above in relation to FIGS. 7 and 8. In step 406, the robotic arm 101 moves the end effector 200 from its present position, and consequently moves the first fork 204, so as to move the first storage container 300a. In the event that the first storage container 300a is stacked on the second storage container 300b, the robotic arm 101 can lift the first storage container 300a so as to disengage the first storage container 300a from the second storage container 300b.

In step 408, the robotic arm 101 moves the end effector 200 so as to align the second fork 206 with the second storage container 300b along the second direction $D_2$. This step can comprise moving the first and second arm segments 116 and 118 so as to vertically and horizontally align the second fork 206 with the second storage container 300b. This step can additionally or alternatively comprise rotating the end effector 200 about the axis $A_6$ such that the prongs 210 of the second fork 206 are aligned with the second storage container 300b. In step 410, the robotic arm 101 moves the second fork 206 so as to couple the second fork 206 to the second storage container 300b in a manner similar to that described above. In step 412, the robotic arm 101 moves the end effector 200 from its present position, and consequently moves the second fork 204, so as to move the second storage container 300b.

In the event that the first and second storage containers 300a and 300b are to be stacked over one another, the robotic manipulator 100 can move a select one of the and first and second storage containers 300a and 300b to a desired location and decouple the select one of the first and second storage containers 300a and 300b from the corresponding one of the first and second forks 204 or 206. The select one of the storage containers may be referred to as a lower storage container. Then, the robotic manipulator 100 can move the other one of the first and second storage containers 300a and 300b to a position that is aligned vertically over the one of the first and second storage containers 300a and 300b. The other one of the storage containers may be referred to as an upper storage container. The robotic manipulator 100 can then lower the upper storage container onto the lower storage container and decouple the upper storage container from the corresponding one of the first and second forks 204 and 206. In some embodiments, the robotic manipulator 100 can lower the upper storage container on an angle such that a portion of the lower end 212 at one of the end walls 306 and 308 engages the lower storage container before a portion of the lower end 212 at the other one of the end walls 306 and 308. As the lower end 212 engages the lower storage container, the lower storage container can be permitted to move slightly along at least one of the longitudinal direction L and the lateral direction A so as to align the lower storage container with the upper storage container. Angling the upper storage container in such a manner can help align the upper and lower storage containers with one another. Small inaccuracies in the positioning of the upper storage container by the robotic manipulator 100 can be offset by allowing such movement of the bottom storage container. It will be understood that the robotic manipulator 100 can be used to reverse the order of stacking of the first and second storage containers 300a.

Figure 13:
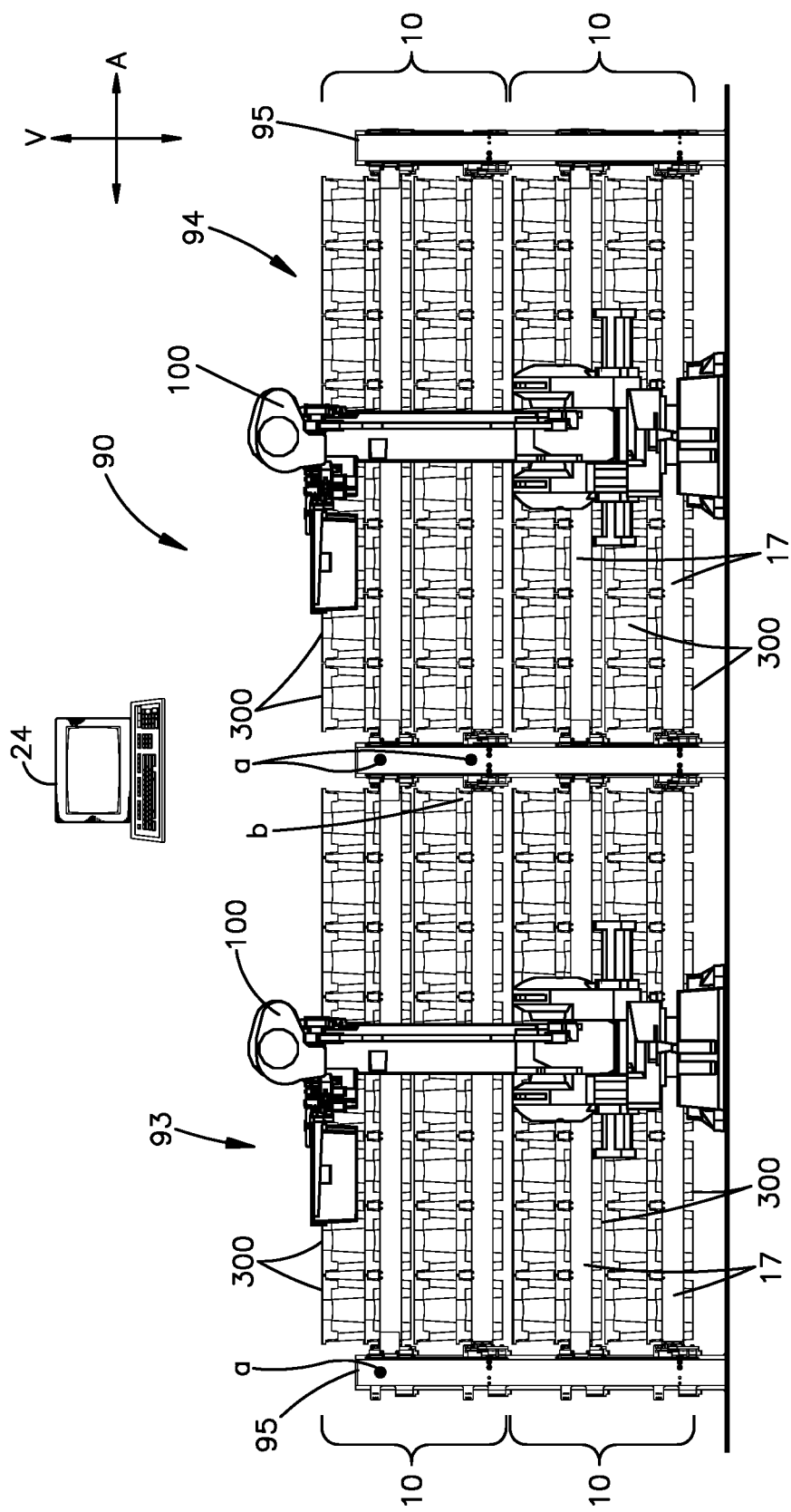
FIG. 13 shows an end view of a storage system according to one embodiment that comprises a two stacks of the storage modules of FIG. 10 and two robotic manipulators.

Turning now to FIGS. 10-13, an inventory storage system can comprise at least one storage module 10 and at least one robotic manipulator 100. Each storage module 10 is configured to store inventory items, and the robotic manipulator 100 is configured to remove storage containers 300 from the storage module 10 and/or place storage containers 300 onto the storage module 10. In FIGS. 10-12, a system is shown having a single storage module 10; however, the system can have at least one vertical stack of storage modules 10 (e.g., two), where each vertical stack includes a plurality of storage modules 10 (e.g., two) stacked over one another. In the event that the system implements a plurality of vertical stacks as shown in FIG. 13, the vertical stacks can be disposed next to one another. The system and each storage module 10 can be configured as any one of the systems and storage modules described in PCT patent application no. PCT/US2018/013920, filed on Jan. 16, 2018, the teachings of all of which are hereby incorporated by reference as if set forth in their entirety herein. However, for ease of discussion, the present invention will be described relative to its use with the storage module shown in FIGS. 1-10 of PCT/US2018/013920.

In general, each inventory storage module 10 has a first module end 12 and a second module end 14 spaced from one another along a longitudinal direction L. Each storage module 10 also has a first module side 11 and a second module side 13 spaced from one another along a lateral direction A, perpendicular to the longitudinal direction L. The longitudinal direction L can be a first horizontal direction, and the lateral direction A can be a second horizontal direction.

Each storage module 10 is elongate from its first module end 12 to its second module end 14 along the longitudinal direction L. For example, each storage module 10 has a module length along the longitudinal direction L from its first module end 12 to its second module end 14 that is greater than a module width of the storage module 10 from its first module side 11 to its second module side 13 along the lateral direction A. The module length can also be greater than a module height along a vertical direction V, perpendicular to both the longitudinal direction L and the lateral direction A. In some embodiments, the module width can be greater than the module height. The overall dimensions (e.g., module length, module width, and module height) of each storage module 10 may be selected to optimize storage density of the stackable storage module 10 or other suitable parameter. For example, the dimensions may be selected to fit within a particular structure (e.g., a shipping container or warehouse).

Each storage module 10 has an upper level and a lower level that are spaced from one another along a vertical direction V. Each of the upper and lower levels are configured to support storage containers 300 that are in turn configured to store inventory items therein. The storage containers 300 can be supported in pairs, where the storage containers 300 of each pair are stacked over one another. Each storage module 10 has a plurality of conveyor segments that define a movement path 19. The movement path 19 can be defined in a plane that extends along the vertical direction V and the longitudinal direction L. The movement path 19 can have a closed shape, such as a rectangle, a loop, an oval, or any other suitable closed and preferably convex shape. Each storage module 10 is configured to move storage containers along its movement path 19. For example, each storage module 10 has an upper conveyor segment 16 and a lower conveyor segment 18 that are spaced from one another along the vertical direction V, and that extend along the longitudinal direction L. The upper and lower conveyor segments 16 and 18 define the upper and lower levels, respectively, discussed above. The module height can be defined from the first conveyor segment 16 to the second conveyor segment 18. Each storage module also has a first connecting conveyor segment 20 adjacent the first module end 12 and a second connecting conveyor segment 22 adjacent the second module end 14. Each of the upper and lower conveyor segments 16 and 18 are configured to move inventory storage containers 300 along the longitudinal direction L between the first and second connecting conveyor segments 20 and 22. Thus, the upper and lower conveyor segments 16 and 18 can be considered to be longitudinal conveyor segments.

The first and second conveyor segments 16 and 18 extend between the first module end 12 and the second module end 14, and between the first module side 11 and the second module side 13. The first and second conveyor segments 16 and 18 are each elongate along the longitudinal direction L. For example, each of the first and second conveyor segments 16 and 18 has a segment length along the longitudinal direction L and a segment width along the lateral direction A, where the segment length is greater than the segment width. Each of the longitudinal conveyor segments 16 and 18 can include a conveyor surface, and the storage module 10 can be configured to move storage containers 300 along the conveyor surfaces along the longitudinal direction L. In some embodiments, each of the conveyor segments 16 and 18 can be configured to move container carriers 17, where each container carrier supports at least one storage container 300 as described below. The conveyor surfaces can be defined by conveyor elements such as tracks, belts, rollers, skate wheels, balls, any other suitable conveyor elements for translating the storage containers 300, or any suitable combination of conveyor elements.

The storage module 10 can include one or more supports that couple the upper and lower conveyor segments 16 and 18 to one another. For instance, the storage module 10 can include one or more supports, such as one or more posts 48, that are coupled to the upper conveyor segment 16 and the lower conveyor segment 18 so as to position the upper conveyor segment 16 above the lower conveyor segment 18. The posts 48 can be disposed at one or both of the first and second module sides 11 and 13.

The first and second connecting conveyor segments 20 and 22 are offset from one another along the longitudinal direction L. Each of the first and second connecting conveyor segments 20 and 22 connect the upper and lower conveyor segments 16 and 18 to one another. Thus, each of the first and second connecting conveyor segments 20 and 22 are configured to move inventory items, which can be stored in the storage containers 300, between the upper and lower conveyor segments 16 and 18. For example, each of the first and second connecting conveyor segments 20 and 22 can be configured to move storage containers 300 along the vertical direction V from one of the upper and lower conveyor segments 16 and 18 to the other one of the upper and lower conveyor segments 16 and 18. In some embodiments, each of the first and second connecting conveyor segments 20 and 22 can be implemented as a vertical lift as described in relation to the any one of the vertical lifts described in PCT/US2018/013920 that is configured to transfer the storage containers 300 along the vertical direction V between the upper and lower conveyor segments 16 and 18.

The upper and lower conveyor segments 16 and 18 can each define a discontinuous conveyor segment, and the vertical lifts 60(1) and 60(2) can transfer the storage containers 300 between the discontinuous conveyor segments. The storage module 10 can be configured such that, when the vertical lifts 60(1) and 60(2) transfer container carriers 17, at least some, up to all, of the container carriers 17 on the upper and lower conveyor segments 16 and 18 remain stationary. The storage module 10 can be configured such that, when the container carriers 17 are moved along the upper and lower conveyor segments 16 and 18, the vertical lifts 60(1) and 60(2) do not move any container carriers 17. In other embodiments (e.g., as shown in FIGS. 11-21 and 24-31 of PCT/US2018/013920), the first and second connecting conveyor segments 20 and 22 can include conveyor surfaces such as (without limitation) tracks that connect the first and second conveyor segments 16 and 18. Thus, in such embodiments, the conveyor segments 16, 18, 20, and 22 together can define a continuous conveying surface or track.

The conveyor segments 16, 18, 20, and 22 together define the movement path 19. The movement path 19 can be elongate along the longitudinal direction L. The movement path 19 can be considered to be a closed movement path in that that conveyor segments 16, 18, 20, and 22 transfer storage containers 300 only around the movement path 19, without transferring storage containers 300 into or outside of the movement path 19. However, it will be understood that the storage containers 300 can be removed from, and placed back into, the movement path 19 by a person or machine such as a robotic arm.

Each storage module 10 can include one or more movement systems (e.g., 50(1), 50(2)) that are configured to move the inventory storage containers 300 along the movement path 19. In one embodiment, each movement system can include a catch 52 that is coupled to an actuator 51 as described in PCT/US2018/013920, or can be configured as another one of the movement systems described therein. The catch 52 can be configured to engage at least one of a container carrier 17 and a storage container 300 so as to push or pull the at least one of the container carrier 17 and a storage container 300 along the movement path 19. The actuator 51 can be configured to move the catch 52 back and forth along the longitudinal direction L so as to push or pull the at least one of the container carrier 17 and a storage container 300. The movement systems and conveyor segments 16, 18, 20, and 22 operate together to move the storage containers 300 around the movement path 19 until a desired one of the storage containers 300 is presented at one of the first module end 12 and the second module end 14. At such position, the desired storage container 300 can be accessed by a person, or machine such as a robotic arm, so that an inventory item can then be placed onto the desired storage container 300 for storage or can be removed from the desired storage container 300 to fulfill a customer order or for further transporting or processing. Additionally or alternatively, the person or machine can remove storage containers 300 from the storage module and place storage containers 300 onto the storage module.

Each storage module can operate in a unidirectional manner such the storage containers 300 can be moved in only a first direction (that is, clockwise or counterclockwise) around the movement path. Alternatively, each storage module can operate in a bidirectional manner such the storage containers 300 can be selectively rotated in one of the first direction and a second direction, opposite the first direction. The movement and positioning of storage containers 300 can be controlled by a controller 24, which can be in wired or wireless communication with the segments of the storage module. The controller 24 can control the speed and optionally the direction in which the storage containers are translated. Further, the controller 24 can stop movement of the storage containers when a desired storage container is presented at one of the first and second ends 12 and 14. The controller 24 can be the same controller as the controller 120 in FIG. 1 or can be a separate controller.

In some embodiments, the storage module can include a plurality of container carriers 17, where each container carrier 17 is configured to support at least one of the inventory storage containers 300. Each container carrier 17 can be configured as described in relation to any one of the container carriers 17 described in PCT/US2018/013920. In such embodiments, the conveyor segments 16, 18, 20, and 22 can be configured to transfer the container carriers 17 around the movement path 19 until a desired one of the container carriers 17 is presented at one of the first and second module ends 12 and 14. Thus, the upper and lower conveyor segments 16 and 18 can be configured to transfer the carriers 17 along the longitudinal direction L, and the first and second conveyor segments 20 and 22 can be configured to transfer container carriers 17 between the upper and lower conveyor segments 16 and 18.

Each container carrier 17 can have a carrier body 26 that is configured to support at least one storage container 300. For example, each carrier body 26 can have a length along the lateral direction A that is sized to support a row of storage containers 300 that extends along the lateral direction A. Thus, the carrier body 26 can support a plurality of storage containers 300 side-by-side or end-to-end along the lateral direction A. The carrier body 26 can be configured to support the storage containers 300 in pairs, where the storage containers 300 of each pair are stacked over one another. Each container carrier 17 can include at least one conveyor-segment engagement feature that is configured to engage the conveyor segments 16, 18, 20, and 22 so that the container carrier 17 can be translated around the movement path 19. In some embodiments, the at least one conveyor-segment engagement feature can include at least one pair of wheel assemblies, where the wheels 34 of the pair are spaced from one another along the lateral direction A, or two pairs of wheel assemblies, where the pairs of wheels are spaced from one another along the longitudinal direction L. However, it will be understood that, in alternative embodiments, the at least one conveyor segment engagement feature can include a feature other than a wheel assembly. For example, each conveyor-segment engagement feature can be a rod or pin that engages a bearing or chain of tracks of the conveyor segments 16, 18, 20, and 22.

In at least some examples, the container carrier 17 can include an identifier. The identifiers may be used to identify a position of the container carrier 17 (and the storage container 300) with respect to the stackable storage module. In some examples, the stackable storage module (or system in which the stackable storage module is implemented) may include any suitable combination of encoders, RFID readers and antenna, cameras, and/or other sensing devices for identifying and locating the container carriers 17 and/or the storage containers 300.

Each storage module 10 can include one or more sensors to provide sensor data that can be used to manage the operation of the stackable storage module. For example, a position sensor may be used to detect positions of the container carriers 17 and/or storage containers 300. As an additional example, an optical scanner may be used to scan the identifier. Other sensors relating to control of the movement system may also be provided. In some examples, other sensors are provided to detect when items protrude out of the storage containers 300 in a way that could be problematic. For example, because the tolerances between modules or between levels of a module may be very tight, it may be desirable that items do not extend beyond a top of the storage containers 300.

With reference to FIG. 13, each storage module 10 can be modular in the sense that each storage module 10 can be fully functional on its own, and multiple instances of the storage modules 10 can be grouped together in clusters (e.g., a group of more than one stackable storage module). When grouped into clusters, each stackable storage module 10 can remain independently controllable by the item movement management system. A cluster of stackable storage modules 10 can be assembled in a fixed structure (e.g., in a warehouse to augment or replace vertical shelving units or other conventional storage means), in a mobile structure (e.g., a shipping container), and in other mobile and non-mobile arrangements. Use of clusters of stackable storage modules 10 may enable increased flexibility with item storage.

A plurality of instances of each storage module 10 can be arranged in a cluster of storage modules 10 in a modular storage and retrieval system 90 as shown in FIG. 13. The system 90 can include at least one vertical stack of the storage modules 10, where each vertical stack comprises at least two storage modules 10 stacked on top of one another along the vertical direction V. In some embodiments, each modular storage and retrieval system can include a plurality of the vertical stacks 93 and 94 of storage modules 10 that are offset from one another along the lateral direction A. Although two vertical stacks 93 and 94, each having two storage modules 10 are shown, it will be understood that the number of vertical stacks and the number of storage modules 10 in each vertical stack can vary from that shown. In particular, modular storage and retrieval systems of the disclosure can include at least one vertical stack of storage modules 10 or more than one vertical stack of storage modules 10. Further, each vertical stack of storage modules 10 can have at least two storage modules 10 stacked on top of one another or more than two storage modules 10. Thus, height, width, and length of the system can be scalable to fit within a desired volume in a warehouse space.

The storage modules 10 can be independently operated such that the storage containers 300 of each storage module 10 can be driven around its corresponding movement path 19 independently of the storage containers 300 of other storage modules being driven around their corresponding movement paths. Thus, the movement paths 19 of each storage module 10 can be independent from and unconnected to the movement paths 19 of the other storage modules 10.

The modular storage and retrieval storage system can include supports 95 that are coupled to the conveyor segments in each storage module 10 in each vertical stack 93 and 94 so as to maintain the storage modules 10 in a stacked relation. The supports 95 can further be coupled to laterally adjacent storage modules 10 so as to attach the vertical stacks 93 and 94 of storage modules 10 to one another. The supports 95 can combine to form a frame of the system. Note that each support 95 can be formed by coupling or fastening the corresponding supports (see e.g., 48 in FIG. 1) of vertically stacked storage modules 10 to one another, or by making the corresponding supports integral to one another.

The storage containers 300 in the storage module 10 can be densely packed along the longitudinal direction L. For example, the storage containers 300 can be supported by the container carriers 17 along the upper and lower conveyor segments 16 and 18 such that the storage containers 300 are densely packed along the upper and lower conveyor segments 16 and 18 along the longitudinal direction L. The container carriers 17 carried by each of the upper and lower conveyor segments 16 and 18 can be arranged end-to-end such that there is little to no space between storage containers 300 of adjacent ones of the container carriers 17. In some embodiments, container carriers 17 and/or storage containers 300 along each conveyor segment may contact one another other. In other embodiments, the storage containers 300 supported by adjacent container carriers 17 may be spaced from each other by a distance that is no more than 10 percent of the overall length or width of each storage container 300 along the longitudinal direction L or no more than 5 percent of the overall length or width of each storage container 300 along the longitudinal direction L. As each container carrier 17 is moved from one of the first and second conveyor segments 16 and 18 to the other, the container carrier 17 can be separated from the container carriers 17 supported by the first and second conveyor segments 16 and 18, thereby avoiding collisions between the moving container carrier 17 and the container carriers 17 supported by the first and second conveyor segments 16 and 18. As a result, the storage containers 300 supported by the first and second conveyor segments 16 and 18 can be spaced closer to one another than in comparable carousel systems where all of the storage units are rotated concurrently.

The storage containers 300 supported by each container carrier 17 can be densely packed along the lateral direction A. For example, the storage containers 300 carried by each container carrier 17 can be arranged side-to-side (or end-to-end) such that there is little to no space between adjacent ones of the storage containers 300. In some embodiments, storage containers 300 supported by each container carrier 17 may contact one another other. In other embodiments, the storage containers 300 may be spaced from each other by a distance that is no more than 10 percent of the overall width of each storage container 300 or no more than 5 percent of the overall width of each storage container 300.

The storage containers 300 in the storage module 10 can be densely packed along the vertical direction V. In particular, the storage containers 300 on the upper conveyor segment 16 can be stacked above the storage containers 300 on the lower conveyor segment 18 so that a gap between the storage containers 300 on upper and lower conveyor segments 16 and 18 can be minimized to maximize storage density. In some examples, the height of this gap can be described by absolute distance, such as a distance ranging from 0.25 inches to 5.0 inches, such as 1.0 inches to 3.0 inches. In one example, the height is about 2.0 inches. In other examples, the height of this gap 5 can be described in relation to a height of one of the storage containers 300, such as a spacing that is no more than 20 percent of the height of the storage containers 300, such as no more than 300 percent of the height of the storage containers 300, such as no more than 10 percent of the height of the storage containers 300, or such as no more than 5 percent of the height of the storage containers 300. Storage density is inversely proportional to the height of the gap between the storage containers 300. Thus, as this height is decreased, the storage density increases.

Further, in systems in which a plurality of the storage modules 10 are stacked over one another, such as shown in FIG. 13, the storage modules 10 in each stack can be densely packed along the vertical direction. In particular, the gap between adjacent ones of the storage modules 10 in the stack can have a height that is defined between the storage containers 300 supported by the lower level of a select one of the storage modules 10 in the stack and the storage containers 300 supported by the upper level of a storage module 10 immediately below the select one of the storage modules 10. The height of this gap can be described by absolute distance, such as a distance ranging from 0.25 inches to 6.0 inches, such as 2.0 inches to 4.0 inches. In one example, the height is about 2.0 inches. In other examples, the height of this gap can be described in relation to a height of one of the storage containers 300, such as a spacing that is no more than 20 percent of the height of the storage containers 300, such as no more than 300 percent of the height of the storage containers 300, such as no more than 10 percent of the height of the storage containers, or such as no more than 5 percent of the height of the storage containers 300. Storage density is inversely proportional to the height of the gap between the storage modules 10. Thus, as this height is decreased, the storage density increases.

Referring to FIGS. 12 and 13, a modular storage and retrieval system can include at least one robotic manipulator 100. Each robotic manipulator 100 can service a single storage module 10, a stack of storage modules 93 or 94, or a plurality of stacks of storage modules 93 and 94. Each robotic manipulator 100 is configured to remove the storage containers 300 from its respective storage modules 10 and/or stow storage containers 300 onto its respective storage modules 10 as described above in relation to FIGS. 1-9.

Each robotic manipulator 100 may include any suitable type and number of sensors and/or cameras disposed throughout the robotic manipulator (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator, including its end effector 200. The sensors and/or cameras can also be used to detect locations of the storage containers 300 to effect movement of the end effector 200 towards desired storage containers.

In alternative embodiments, each robotic manipulator can detect locations of the storage containers 300 blindly without the use of sensors that locate the storage containers 300. Turning briefly to FIG. 5, a pointer 228 can be attached to the end effector 200, such as to one of the prongs 208 or 210 of the end effector 200. Referring back to FIG. 13, the robotic manipulator 100 can be trained by pointing the pointer 228 to at least one select position on a storage module 10. For example, the pointer 228 can be pointed to at least one select position "a" on the, such as a plurality of positions "a". Two of the positions "a" can be aligned along the lateral direction A so as to correspond to an x-axis, and two of the positions "a" can be aligned along the vertical direction V so as to correspond to a y-axis in a coordinate plane. The robotic manipulator can further be trained to the position of a select storage container 15 of one of the storage modules 10 by positioning the prongs of one of the forks on either side of the select storage container 15 (see e.g., position "b"). The controller 120 of the robotic manipulator 100 can store the select positions and the position of the select storage container 15 so that the controller 120 can return the end effector 200 of the robotic manipulator 100 to the position of the select storage container 15 when needed. The positions of other ones of the storage containers 300 can then be calculated based on the position of the select storage container 15, and the calculated positions can be stored in the controller 120 so that the controller 120 can move the end effector 200 of the robotic manipulator 100 to any one of the other storage container positions when needed. Alternatively, the robotic manipulator 100 can further be trained to the positions of the other storage containers 15 by sequentially positioning the prongs of one of the forks on either side of the other storage containers 15, and storing the positions of the other storage containers 15. The pointer 228 can be removed after training the robotic manipulator 100.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range. The terms "about" and "approximately" can be understood as describing a range that is within 15 percent of a specified value unless otherwise stated.

What is claimed:

1. An end effector for a robotic manipulator, the end effector comprising:
   a base that is configured to attach to an end of a robotic arm of the robotic manipulator;
   a first fork that includes a first pair of prongs that extend from the base along a first direction and that are spaced from one another along a first perpendicular direction that is perpendicular to the first direction, the first pair of prongs configured to receive a first storage container therebetween; and
   a second fork that includes a second pair of prongs that extend from the base along a second direction that is angularly offset from the first direction, and that are spaced from one another along a second perpendicular direction that is perpendicular to the second direction, the second pair of prongs configured to receive a second storage container therebetween,
   wherein the first fork includes at least one protrusion that extends upwardly from at least one of the prongs of the first fork, the at least one protrusion configured to be received in at least one recess of an upper rim of the first storage container.

2. The end effector of claim 1, wherein the first fork is configured to receive a first storage container therebetween such that each prong of the first pair is adjacent to a respective sidewall of the storage container.

3. The end effector of claim 1, wherein the first fork is configured such that positions of the prongs of the first fork are fixed relative to one another as the first fork is coupled to the first storage container.

4. The end effector of claim 3, wherein the second fork is configured such that positions of the prongs of the second fork are fixed relative to one another as the second fork is coupled to the second storage container.

5. The end effector of claim 1, wherein the second direction is substantially perpendicular to the first direction.

6. The end effector of claim 1, wherein the first and second forks have positions that are fixed relative to one another and relative to the base.

7. A robotic manipulator comprising:
a robotic arm; and
the end effector of claim 1 attached to an end of the robotic arm.

8. An end effector for a robotic manipulator, the end effector comprising:
a base that is configured to attach to an end of a robotic arm of the robotic manipulator;
a first fork that includes a first pair of prongs that extend from the base along a first direction and that are spaced from one another along a first perpendicular direction that is perpendicular to the first direction, the first pair of prongs configured to receive a first storage container therebetween; and
a second fork that includes a second pair of prongs that extend from the base along a second direction that is angularly offset from the first direction, and that are spaced from one another along a second perpendicular direction that is perpendicular to the second direction, the second pair of prongs configured to receive a second storage container therebetween,
wherein the first fork includes a first clamp mechanism that is configured to clamp an upper rim of the first storage container between the first clamp mechanism and at least one of the prongs of the first fork.

9. The end effector of claim 8, wherein the first fork includes at least one protrusion that extends upwardly from at least one of the prongs of the first fork, the at least one protrusion configured to be received in at least one recess of an upper rim of the first storage container.

10. The end effector of claim 8, wherein the first fork includes a first clamp mechanism that includes a clamp and a clamp arm that is attached to the clamp, wherein the clamp is configured to move the clamp arm between a clamped position in which the clamp arm is spaced above the prongs of the first fork by a first distance, and a released position in which the clamp arm is spaced above the prongs of the first fork by a second distance that is greater than the first distance.

11. The end effector of claim 10, wherein the first clamp mechanism includes a catch that extends downward from the clamp arm between the prongs of the first fork, wherein the catch is configured to engage an inner surface of the storage container when the first clamp mechanism is in the clamped position.

12. An end effector for a robotic manipulator, the end effector comprising:
a base that is configured to attach to an end of a robotic arm of the robotic manipulator;
a first fork that includes a first pair of prongs that extend from the base along a first direction and that are spaced from one another along a first perpendicular direction that is perpendicular to the first direction, the first pair of prongs configured to receive a first storage container therebetween; and
a second fork that includes a second pair of prongs that extend from the base along a second direction that is angularly offset from the first direction, and that are spaced from one another along a second perpendicular direction that is perpendicular to the second direction, the second pair of prongs configured to receive a second storage container therebetween,
wherein the first fork includes a handle catch that extends upward between the prongs of the first fork, wherein the handle catch is configured to engage an inner surface of a handle of the first storage container when the first storage container is supported by the first fork.

13. The end effector of claim 12, wherein the first fork includes a first clamp mechanism that is configured to clamp an upper rim of the first storage container between the first clamp mechanism and at least one of the prongs of the first fork.

14. A method of operating a robotic manipulator, comprising:
(a) causing a robotic arm to move an end effector so as to align a first fork of the end effector with a first storage container;
(b) causing the robotic arm to move the first fork so as to couple the first fork to the first storage container;
(c) causing the robotic arm to move the end effector so as to align a second fork of the end effector with a second storage container; and
(d) causing the robotic arm to move the second fork so as to couple the second fork to the second storage container,
wherein step (b) comprises:
causing the robotic arm to translate a pair of prongs of the first fork along opposite sidewalls of the first storage container at a location below an upper end of the first storage container; and
causing the robotic arm to translate the first fork upwards along the first storage container such that the pair of prongs engage an upper rim of the first storage container.

15. The method of claim 14, wherein step (a) comprises at least one of:
causing robotic arm to move so as to vertically and horizontally align the first fork with the first storage container; and
causing the robotic arm to rotate the end effector so as to align prongs of the first fork with the first storage container.

16. The method of claim 14, wherein step (b) comprises causing at least one protrusion that extends upwardly from at least one of the prongs of the first fork to be received in at least one recess of the upper rim.

17. The method of claim 14, wherein step (b) comprises causing a clamping mechanism to move from a released position to the clamped position so as to clamp the upper rim of the first storage container between the clamping mechanism and at least one of the prongs of the first fork.

18. The method of claim 14, wherein the first storage container is stacked on the second storage container, and step (b) comprises causing the robotic arm to lift the first storage container so as to disengage the first storage container from the second storage container.

19. The method of claim 14, wherein step (d) comprises:
causing the robotic arm to translate a pair of prongs of the second fork along opposite sidewalls of the second storage container at a location below an upper end of the second storage container; and
causing the robotic arm to translate the second fork upwards along the second storage container such that the pair of prongs engage an upper rim of the second storage container.

20. The method of claim 14, wherein the method comprises:
causing the robotic arm to move a select one of the and first and second storage containers to a desired location;

decoupling the select one of the first and second storage containers from a corresponding one of the first and second forks;

causing the robotic manipulator to move the other one of the first and second storage containers to a position that is aligned vertically over the select one of the first and second storage containers;

causing the robotic manipulator to lower the other one of the first and second storage containers onto the select one of the first and second storage containers so as to stack the first and second storage containers; and decoupling the other one of the first and second storage containers from a corresponding one of the first and second forks.

* * * * *